(12) United States Patent
Kohama

(10) Patent No.: US 10,766,286 B2
(45) Date of Patent: Sep. 8, 2020

(54) PRINT CONTROL DEVICE, PRINT CONTROL METHOD, RECORDING MEDIUM STORING A PRINT CONTROL PROGRAM, AND A PRINTING SYSTEM

(71) Applicant: SEIKO EPSON CORPORATION, Tokyo (JP)

(72) Inventor: Yuji Kohama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/174,347

(22) Filed: Oct. 30, 2018

(65) Prior Publication Data

US 2019/0126652 A1 May 2, 2019

(30) Foreign Application Priority Data

Nov. 1, 2017 (JP) ................................. 2017-212268

(51) Int. Cl.
*B41J 29/38* (2006.01)
*B41J 29/393* (2006.01)
*G06F 3/12* (2006.01)

(52) U.S. Cl.
CPC ........... *B41J 29/393* (2013.01); *G06F 3/1211* (2013.01); *G06F 3/1241* (2013.01); *G06F 3/1244* (2013.01); *G06F 3/1288* (2013.01)

(58) Field of Classification Search
CPC ..................................................... B41J 29/393

USPC .................................................. 347/9, 12, 19
See application file for complete search history.

(56) References Cited

U.S. PATENT DOCUMENTS

2006/0209109 A1* 9/2006 Arazaki ................. B41J 29/393
347/12

FOREIGN PATENT DOCUMENTS

JP             2002-055790 A      2/2002

* cited by examiner

*Primary Examiner* — Lam S Nguyen
(74) *Attorney, Agent, or Firm* — Global IP Counselors, LLP

(57) ABSTRACT

Provided is technology enabling efficient printing based on the type of printing device. A print control device that communicates with a management device, which manages a printing device, includes: an acquisition unit configured to acquire from the management device printing device information indicating whether a printing device the management device manages is a first printing device, which processes first band data of bands that are long in a first direction of a print object, or a second printing device, which processes second band data of bands that are long in a second direction intersecting the first direction of the print object; a band data generator configured to determine the length direction of band data based on the acquired printing device information, and generate band data in the determined length direction from the print object; and a transmitter configured to send the band data to the management device.

6 Claims, 11 Drawing Sheets

PRINT CONTROL DEVICE, PRINT CONTROL METHOD, RECORDING MEDIUM STORING A PRINT CONTROL PROGRAM, AND A PRINTING SYSTEM

BACKGROUND

1. Technical Field

The present invention relates to a print control device, a print control method, a recording medium storing a print control program, and a printing system.

2. Related Art

JP-A-2002-55790 describes a system configured to generate and send bitmap images to a printing device by means of a host computer for printing, the system including a print spooling means that spools drawing information from a printing application, a decision means that determines the banding direction of bands forming the bitmap image based on the spooled drawing information and the conveyance direction of the print medium by the printing device, and a generating means that generates a bitmap image of the spooled drawing information according to the selected banding direction. The decision means determines the banding direction in the opposite direction as the conveyance direction of the print medium in the printing device.

The direction of the bands the printing device processes (vertical bands or horizontal bands) differs according to the type of printing device. However, JP-A-2002-55790 does not address generating and transferring bands of the direction appropriate to the type of printing device. As a result, printing cannot be processed efficiently according to the type of printing device.

SUMMARY

The present invention is directed to solving at part of the foregoing problem, and provides a print control device, a print control method, a print control program, and a printing system enabling printing efficiently with consideration for the type of printing device.

print control device that communicates with a management device, which manages a printing device, including: an acquisition unit configured to acquire from the management device printing device information indicating whether a printing device the management device manages is a first printing device, which processes first band data of bands that are long in a first direction of a print object, or a second printing device, which processes second band data of bands that are long in a second direction intersecting the first direction of the print object; a band data generator configured to determine the length direction of band data based on the acquired printing device information, and generate band data in the determined length direction from the print object; and a transmitter configured to send the band data to the management device.

In this configuration, the print control device acquires, from the management device that manages the printing device, printing device information indicating the type of printing device (whether the printing device is a first printing device or a second printing device), generates band data with a length direction based on the acquired printing device information, and sends the band data to the management device. As a result, band data of an orientation appropriate to the type of printing device is provided to the management device, and subsequent processing by the management device and printing device until printing ends is more efficient.

A print control device according to another aspect of the invention also has: a selector configured to select a printing device to use from among one or more printing devices the management device manages; the acquisition unit acquiring the printing device information of the selected printing device.

In this configuration the print control device acquires from the management device printing device information for the printing device selected in response to a user operation, provides to the management device band data of an orientation appropriate to the type of printing device selected, and subsequent processing by the management device and selected printing device until printing ends is more efficient.

In a print control device according to another aspect of the invention, the band data generator determines, based on the acquired printing device information, the length direction of the band data is the first direction when a first printing device is included in the one or more printing devices the management device manages; and determines, based on the acquired printing device information, the length direction of the band data is the second direction when a first printing device is not included in the one or more printing devices the management device manages.

In this configuration, when there is at least one first printing device among the printing devices managed by the management device, using the first printing device for printing is prioritized, and band data of an orientation appropriate to a first printing device is supplied to the management device. As a result, processing by the management device when a first printing device is used for printing is more efficient. In addition, when even one first printing device is not included in the printing devices managed by the management device, band data of an orientation appropriate to a second printing device is supplied to the management device. As a result, processing by the management device is more efficient.

In a print control device according to another aspect of the invention, the printing device information is information indicating whether a printing device is a first printing device that prints by multiple printheads disposed in a direction intersecting the conveyance direction of the print medium, or is a second printing device that prints by scanning a printhead in a direction intersecting the conveyance direction of the print medium, and the conveyance direction of the print medium is the first direction, and the direction intersecting the conveyance direction is the second direction.

This configuration enables providing to the management device band data in the appropriate orientation according to whether the printing device is a first printing device that prints with a line printhead, or is a second printing device that prints with a serial printhead.

In a print control device aspect of the invention, the printing device information includes media orientation information indicating the orientation of the print medium set in the printing device; and the band data generator determines the length direction of the band data based on whether the acquired printing device information indicates a first printing device or second printing device, and the media orientation information.

This configuration enables the print control device to provide to the management device band data in an orientation appropriate to the type of printing device and the orientation of the print medium set in the printing device, and can improve processing efficiency by the management device.

The technical concept of the invention can be expressed by means other than a physical object such as a print control device. For example, the invention can also be expressed as a method (print control method) of steps executed by parts of the print control device, as a program (print control program) causing a computer to execute the method, and as a computer-readable recording medium (storage medium) storing the program.

The invention can also be embodied by devices equivalent to a management device and printing device, individual methods and programs, and systems including multiple devices.

For example, the invention may also be characterized as a printing system including a printing device and a management device that manages the printing device, wherein: the printing device includes an authentication request receiver configured to receive an authentication request by a user operation, and send the received authentication request to the management device, and a print mechanism configured to print based on received print data; and the management device includes an authentication unit that determines whether or not to permit printing in response to the authentication request when an authentication request is received, and a print data generator configured to generate, from the first band data, first print data in which the first direction is the length direction and send the generated first print data to the printing device authenticated for printing, when the printing device the authentication unit authenticates for printing is a first printing device that processes first band data segmented with a first direction of the print object the length direction, and when the printing device the authentication unit authenticates for printing is a second printing device that processes second band data segmented with a second direction, which intersects the first direction of the print object, as the length direction, converts the first band data to second band data, generates from the converted second band data second print data in which the second direction is the length direction, and sends the generated second print data to the printing device authenticated for printing.

This configuration presumes that the printing device that sends an authentication request in response to a user operation to the management device is a first printing device, and the management device has band data (first band data) of an orientation appropriate to the first printing device. As a result, when printing through the first printing device is allowed by the authentication unit, downstream process is more efficient.

Other objects and attainments together with a fuller understanding of the invention will become apparent and appreciated by referring to the following description and claims taken in conjunction with the accompanying drawings.

DESCRIPTION OF EMBODIMENTS

Preferred embodiments of the present invention are described below with reference to the accompanying figures. Note that the accompanying figures are for descriptive purposes only.

1. System Configuration

Figure 1:
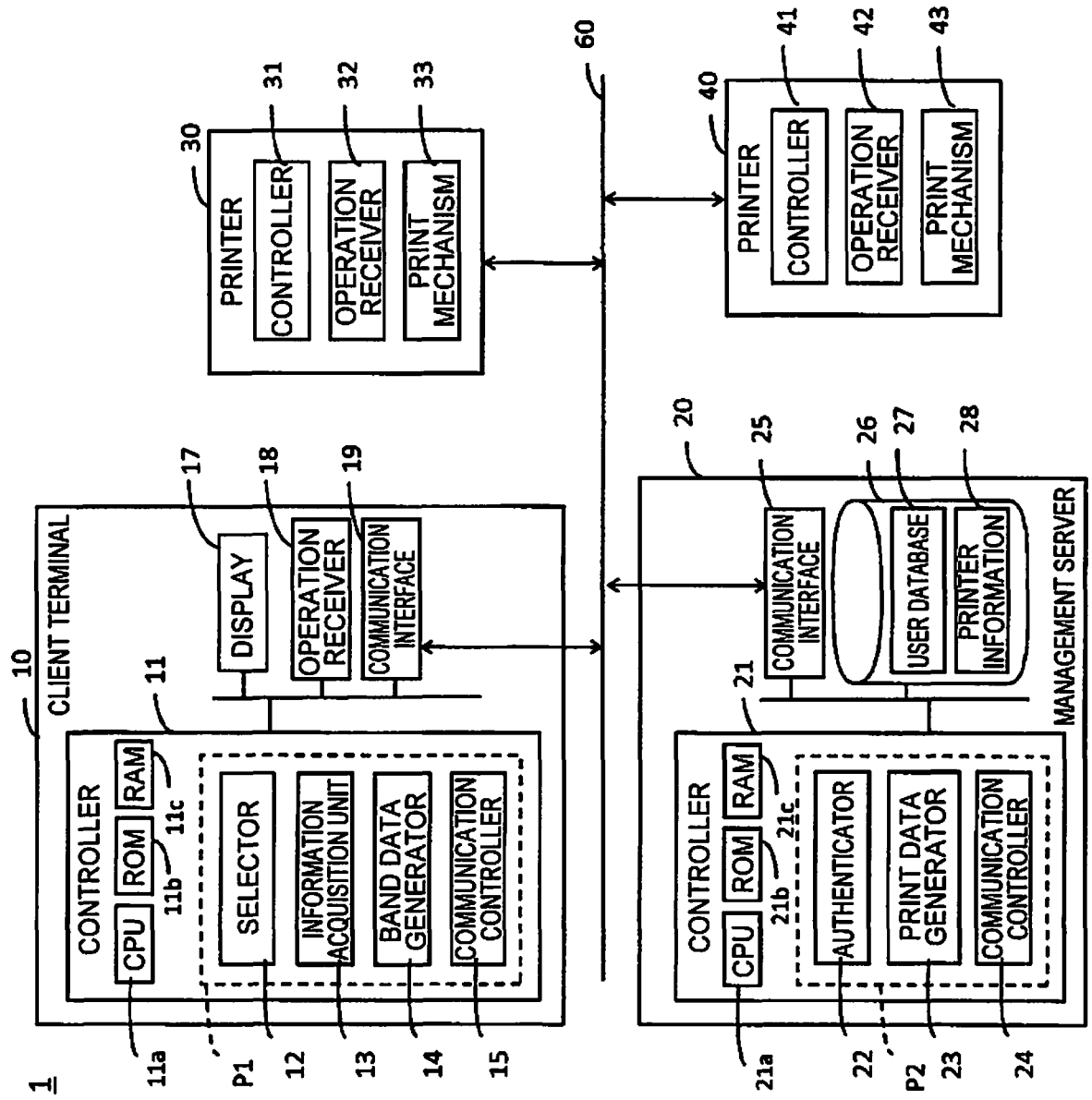
FIG. 1 is a simplified block diagram of a system.

FIG. 1 is a simplified block diagram of a system 1 according to the invention. At least part of this system 1 is a printing system. The system 1 includes a client terminal 10, a management server 20, and one or more printers (printers 30 and 40 in this example). The printers 30 and 40 are examples of printing devices, and the management server 20 is an example of a management device that manages the printing devices. The client terminal 10 is an example of a print control device that communicates with the management device.

The client terminal 10 may be a personal computer (PC), smartphone, tablet terminal, mobile phone, or other communication terminal with comparable capabilities. Hardware capable of embodying the client terminal 10, and particularly the controller 11, may also be referred to as a print control device.

The management server 20 is embodied by one or more information processing devices that function as a server on a network.

The printers 30 and 40 are devices that function as at least a printer, and may be a multifunction device having other functions such as a scanner or fax machine. Note that the example shown in FIG. 1 has two printers 30 and 40, but the number of printers managed by the management server 20 is obviously not specifically limited.

The client terminal 10, management server 20, and printers 30 and 40 are connected to a network 60, and can communicate with other devices through the network 60. The network 60 may be a local area network (LAN), the Internet, a cell phone network, or other type of communication network.

The client terminal 10 includes, for example, a controller 11, display 17, operation receiver 18, and communication interface 19. The controller 11 includes one or more IC chips such as a CPU 11a, ROM 11b, RAM 11c, or other memory devices. The controller 11 executes processes according to programs stored in ROM 11b using RAM 11c as working memory, for example, and thereby controls operation of the client terminal 10. The controller 11 has a program P1, and by running the program P1 executes the functions of a selector 12, information acquisition unit 13, band data generator 14, and communication controller 15. The program P1 may be referred to as a printer driver or print control program, for example.

The communication interface 19 is a general term for an interface through which the controller 11 communicates with external devices through the network 60 according to a specific communication protocol.

The display 17 is a means of presenting information visually, and may be an LCD device or OLED device, for example. The display 17 may be a configuration including a display and a drive circuit for driving the display.

The operation receiver 18 is a means of receiving user operations, and may be include physical buttons, a touch panel, a mouse, or a keyboard, for example. The touch panel may obviously also be configured as part of the display 17. The display 17 and operation receiver 18 combined may also be referred to as the operating panel of the client terminal 10.

The management server 20 includes, for example, a controller 21, communication interface 25, and storage 26. The controller 21 includes one or more IC chips such as a CPU 21a, ROM 21b, RAM 21c, or other memory devices. The controller 21 executes processes according to programs stored in ROM 21b using RAM 21c as working memory, for example, and thereby controls operation of the management server 20. The controller 21 has a program P2, and by running the program P2 executes the functions of a authenticator 22, print data generator 23, and communication controller 24. The program P2 may be referred to as a print manager program, for example.

The communication interface 25 is a general term for an interface through which the controller 21 communicates with external devices through the network 60 according to a specific communication protocol.

The storage 26 may be a hard disk drive or other data storage means. A user database 27 and printer information 28, for example, are stored in the storage 26.

Printer 30 includes a controller 31, operation receiver 32, and print mechanism 33, and printer 40 includes a controller 41, operation receiver 42, and print mechanism 43. In the printer 30 (40), the controller 31 (41) controls operation of the printer 30 (40) by the cooperation of hardware and a program (firmware). The print mechanism 33 (43) is a mechanism for printing based on print data sent to the printer 30 (40) from the management server 20 through the network 60. The operation receiver 32 (42) is functionally similar to the operation receiver 18 described above. The operation receiver 32 (42) may also be an operating panel including a display.

Figure 2:
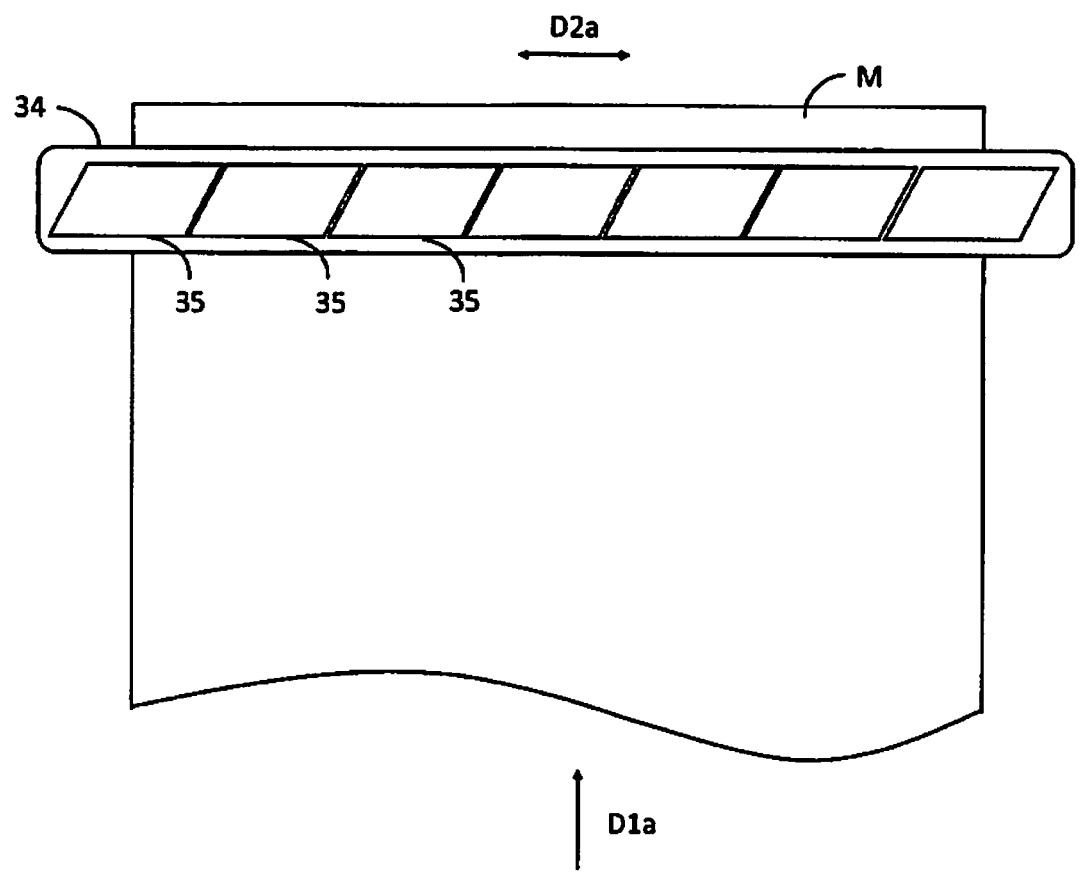
FIG. 2 illustrates part of the print mechanism of a first printing device.
Figure 3:
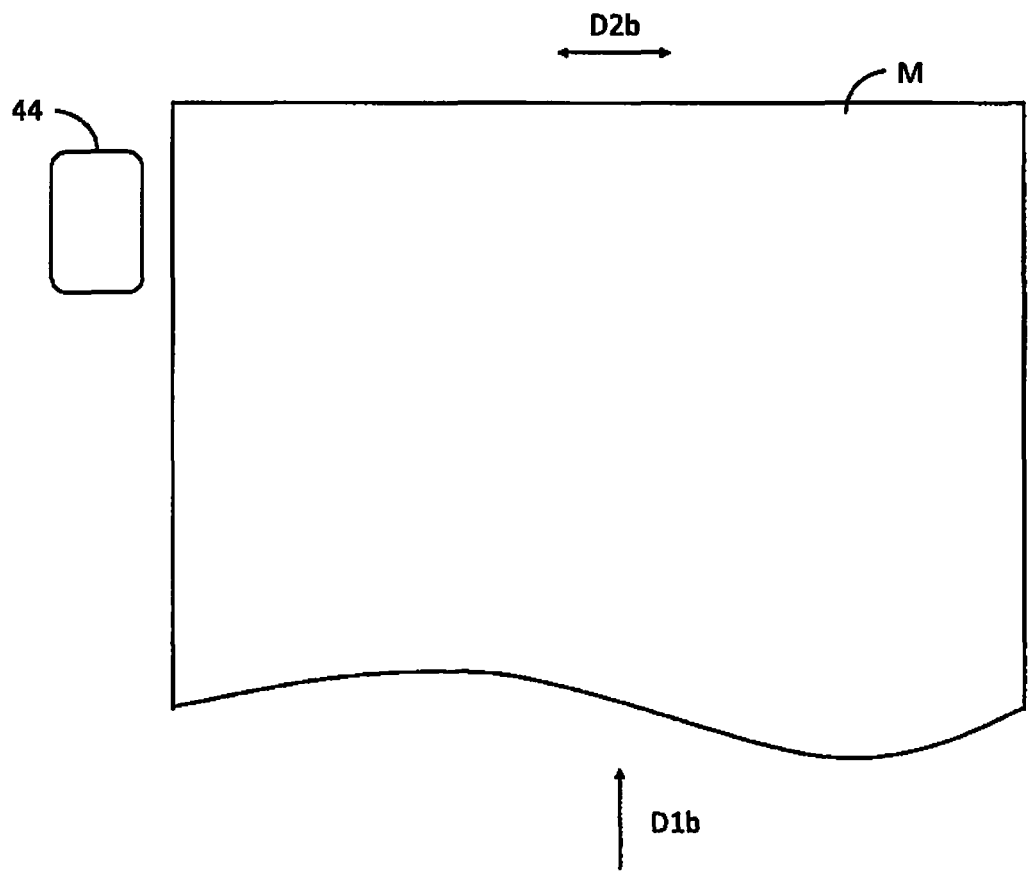
FIG. 3 illustrates part of the print mechanism of a second printing device.

FIG. 2 schematically illustrates part of the print mechanism 33 (FIG. 1) of the printer 30. The print mechanism 33 has a long printhead unit 34. The printhead unit 34 is stationary in the print mechanism 33, and is a unit of multiple printheads 35 aligned in direction D2a intersecting the conveyance direction (direction D1a) of the print medium M. In FIG. 2 and FIG. 3, intersecting basically means perpendicular, bit perpendicular as used herein does not mean precisely mathematically perpendicular, and includes intersections that may deviate from perpendicular in products such as printers.

The individual printheads 35 may also be referred to as head chips. Each printhead 35 has multiple nozzles for ejecting ink or other fluid. In the example in FIG. 2, the shape of the nozzle face through which the nozzles open in each printhead 35 is a parallelogram having sides inclined to direction D1a and sides parallel to direction D2a. The relationship between the multiple printheads 35 and the printhead unit 34 in each printhead 35 may be the same as the configuration of the multiple recording heads and head units described in FIG. 4 of JP-A-2017-140812.

Note that the plane shape of the nozzle face of the printhead 35 is not limited to a parallelogram, and may be rectangular, trapezoidal, or other polygonal shape. By aligning multiple printheads 35 in direction D2a, a printhead unit 34 capable of printing across the full width (the width on direction D2a) of the print medium M conveyed in direction D1a. The printhead unit 34 may also be referred to as a line printhead.

The printer 30 prints using the entire printhead unit 34 prints by driving the individual printheads 35 based on band data (part of the print data) for bands that are long in direction D1a. In this embodiment of the invention, the conveyance direction of the print medium M is referred to as the first direction, and the direction intersecting the conveyance direction is referred to as the second direction.

Printer 30 is therefore an example of a first printing device that processes first band data dividing the print object into bands that are long in the first direction of the print object.

FIG. 3 illustrates part of the print mechanism 43 (FIG. 1) of printer 40. This print mechanism 43 has a printhead 44 that moves bidirectionally on a carriage not shown. The printhead 44 can move bidirectionally in direction D2b intersecting the conveyance direction of the print medium M (direction D1b). Like the printhead 35 described above, printhead 44 has multiple nozzles that can eject ink or other fluid. By the printhead 44 moving (scanning) along the direction D2b, the printhead 44 can print across the full width of the print medium M (the width in direction D2b). This printhead 44 is also referred to as a serial printhead.

This printer 40 prints in scanning units by driving the printhead 44 during each scan based on band data (part of the print data) for bands that are long in direction D2b while alternately conveying (feeding) the print medium M in the direction D1b and moving the printhead 44 in direction D2b.

Printer 40 is therefore an example of a second printing device that processes second band data dividing the print object into bands that are long in the second direction intersecting the first direction of the print object.

While not shown in the figures, the print mechanism 33 (43) also has a conveyance mechanism for conveying the print medium M in the conveyance direction.

It will also be obvious that the client terminal 10, management server 20, and printers 30 and 40 also have various general functions and abilities of common personal computers, servers, and printers. Note also that all of the content shown in FIG. 1 is not necessarily essential to the embodiments described below.

2. Embodiment 1

Figure 4:
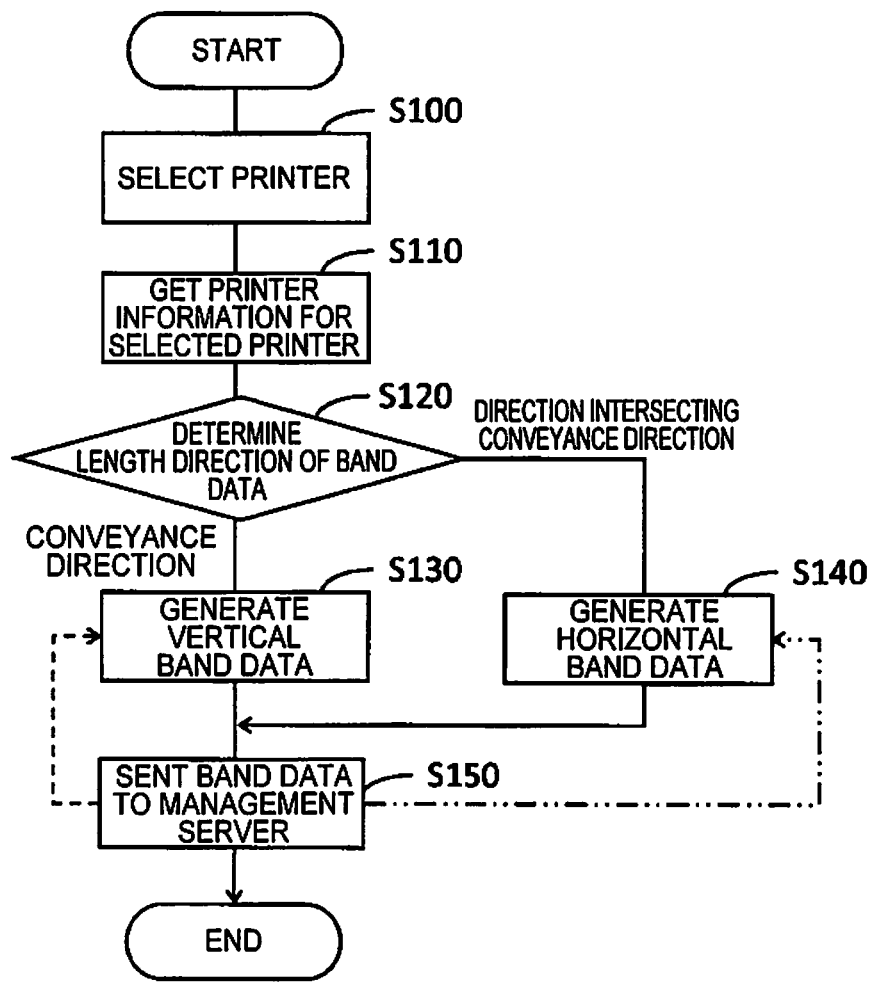
FIG. 4 is a flow chart of a process run by a client terminal in a first embodiment of the invention.

FIG. 4 is a flow chart of the print control process (print control method) the controller 11 of the client terminal 10 executes according to program P1 in a first embodiment of the invention.

The controller 11 (selector 12) selects the printer to print the print object from among the one or more printers managed by the management server 20 (step S100). In this first embodiment of the invention, the selector 12 selects the printer in response to a user operation For example, the selector 12 presents on the display 17 a printer selection screen (not shown in the figure) listing the one or more printers the management server 20 manages. By the communication controller 15 communicating with the management server 20 through the communication interface 19 before displaying the printer selection screen, the controller 11 can acquire from the management server 20 information (printer information 28) related to the printers the management server 20 manages.

The printer information 28 is information identifying the model, name (product name), serial number, or other information about each printer the management server 20 manages, and is stored in the storage 26 of the management server 20. Based on the printer information 28 acquired from the management server 20, the selector 12 generates a printer selection screen listing the name, model, or other features of each printer the management server 20 manages, and presents the generated printer selection screen on the display 17. The information related to the printers 30 and 40 can be read in the printer selection screen. By operating the operation receiver 18, the user selects the desired printer from among the printers listed in the printer selection screen shown on the display 17. Based on the selection by the user, the selector 12 then selects the printer (receives the user's selection of a printer).

In step S110, the controller 11 (information acquisition unit 13) gets the printer information related to the printer selected in step S100. By displaying a printer selection screen, the controller 11 thus acquires from the management server 20 the printer information 28 already registered for printers the management server 20 manages. In step S110, the information acquisition unit 13 acquires (extracts) the printer information related to the printer selected in step S100 from the printer information 28 acquired from the management server 20 for each printer.

As described above, the printer information 28 contains type (model) information for each printer the management server 20 manages. This type (model) information may be said to include information that directly or indirectly identifies whether a particular printer is a first printing device or a second printing device. Therefore, by step S110 (or steps S100, S110), the information acquisition unit 13 (or communication controller 15 and information acquisition unit 13) can be said to function as an information acquisition unit that acquires from the management server 20 printing device information indicating whether a printer managed by the management server 20 is a first printing device or a second printing device.

In step S120, the controller 11 (band data generator 14), based on the printer information acquired in step S110, determines the lengthwise direction of the band data to generate, and the process branches based on the decision. When the printer information acquired in step S110 (the printer information for the printer selected in step S100) indicates the printer is a first printing device, the band data generator 14 determines the lengthwise direction of the band data is the first direction, that is, is the same as the conveyance direction of the print medium, and goes to step S130. If the printer information acquired in step S110 (the printer information for the printer selected in step S100) indicates the printer is a second printing device, the band data generator 14 determines the lengthwise direction of the band data is the second direction, that is, crosswise to the conveyance direction of the print medium, and goes to step S140.

When control goes to step S130, the band data generator 14 generates from the print object band data that is long in the conveyance direction of the print medium.

When control goes to step S140, the band data generator 14 generates from the print object band data that is long in the direction crosswise to the conveyance direction of the print medium.

Figure 5:
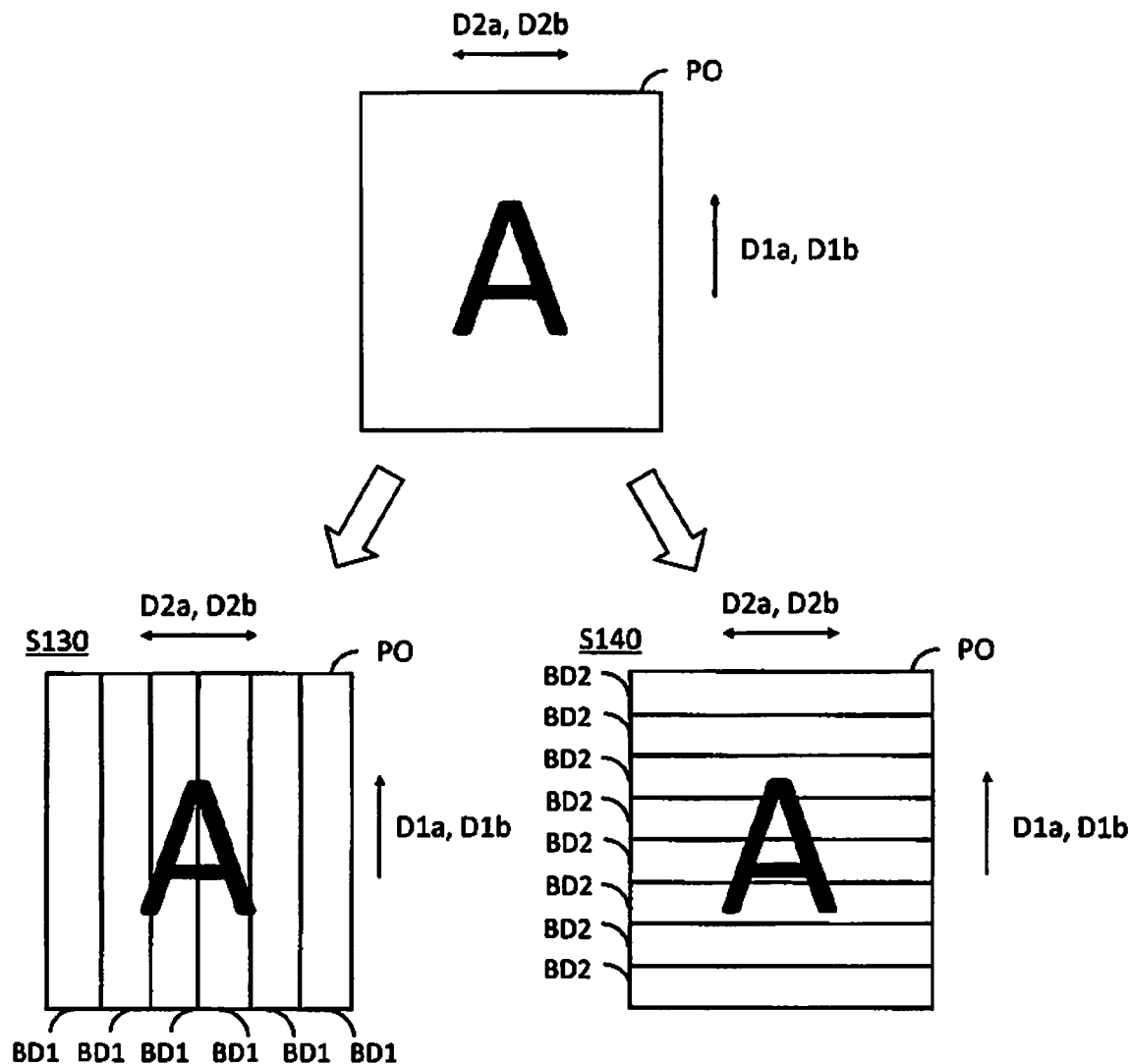
FIG. 5 describes a specific example a band data generating process.

FIG. 5 describes specific examples of step S130 and S140 (band data generating process).

Reference PO indicates a one-page print object (print object page PO). A print object is data describing an object such as text, a photograph, or a computer graphic, and while not described in detail, and is selected as desired by the user operating the operation receiver 18. The print object page PO is bitmap data acquired by rendering the print object, and in this example has RGB (red, green, blue) gradation values, for example, for each pixel. The band data generator 14 generates band data for plural bands from the print object page PO. Note that the relationship between the orientation of the print object page PO, and the direction (direction D1a, D1b, and direction D2a, D2b) in which the print object page PO is printed by the printer, are shown together in FIG. 5.

By dividing the print object page PO into bands of a specific band width in the direction (direction D2a, D2b) crosswise to the conveyance direction in step S130, the band data generator 14 sequentially generates left to right from one side to the other side of the page first band data BD1 that is long in the conveyance direction (direction D1a, D1b). The band width (pixel count) of the first band data BD1 the band data generator 14 generates in step S130 is a length equivalent to the width in direction D2a of the printheads 35 (FIG. 2) forming the printhead unit 34 of the first printing device (printer 30). The printer information includes information indicating the band width of the particular printer.

The first band data BD1 may also be described as an area of multiple sets of raster data (lines of raster data) in the conveyance direction of the print object page PO (data of multiple pixels arrayed in a specific direction).

By dividing the print object page PO into bands of a specific band width in the conveyance direction (direction D1a, D1b) in step S140, the band data generator 14 sequentially generates second band data BD2 that is long in the direction intersecting the conveyance direction (direction D2a, D2b) from the top to the bottom of the page. The band width (pixel count) of the second band data BD2 the band data generator 14 generates in step S140 is a length equivalent to the width in direction D1b of the printhead 44 (FIG. 3) of the second printing device (printer 40).

The second band data BD2 may also be described as an area of multiple sets of raster data (lines of raster data) intersecting the conveyance direction of the print object page PO.

Note that because in FIG. 5 the vertical (top-bottom) direction of the print object page PO corresponds to the conveyance direction (direction D1a, D1b), and the horizontal (left-right) direction of the print object page PO corresponds to the direction intersecting the conveyance direction (direction D2a, D2b), the first band data BD1 generated in step S130 may be referred to as vertically long (or simply vertical) band data, and the second band data BD2 generated in step S140 may be referred to as horizontally long (or simply horizontal) band data.

In step S150 (FIG. 4), the controller 11 (communication controller 15) sends the generated band data through the communication interface 19 to the management server 20. The communication controller 15 and communication interface 19 are equivalent to a transmitter that sends band data to the management server. Note that each time a band of band data is generated by the band data generator 14, the generated band data is sent sequentially to the management server 20. Therefore, when control goes from step S120 to step S130, first band data BD1 is generated in step S130, and the first band data BD1 is transmitted in step S150, this sequence of steps repeats until first band data BD1 is generated and transmitted for all of the print object (indicated by the dotted line in FIG. 4).

Likewise, when control goes from step S120 to step S140, second band data BD2 is generated in step S140, and the second band data BD2 is transmitted in step S150, this sequence of steps repeats until second band data BD2 is generated and transmitted for all of the print object (indicated by the dot-dot-dash line in FIG. 4).

Note that the band data generator 14 adds to the band data generated as described above printer identification information (such as the serial number of the printer) uniquely identifying the printer selected in step S100. In addition, the band data generator 14 adds to the last band data generated from the print object information indicating it is the last band data for that print object.

Note also that the band data generator 14 may, for example, compress the generated band data to lighten the communication load of transmission to the management server 20.

Figure 6:
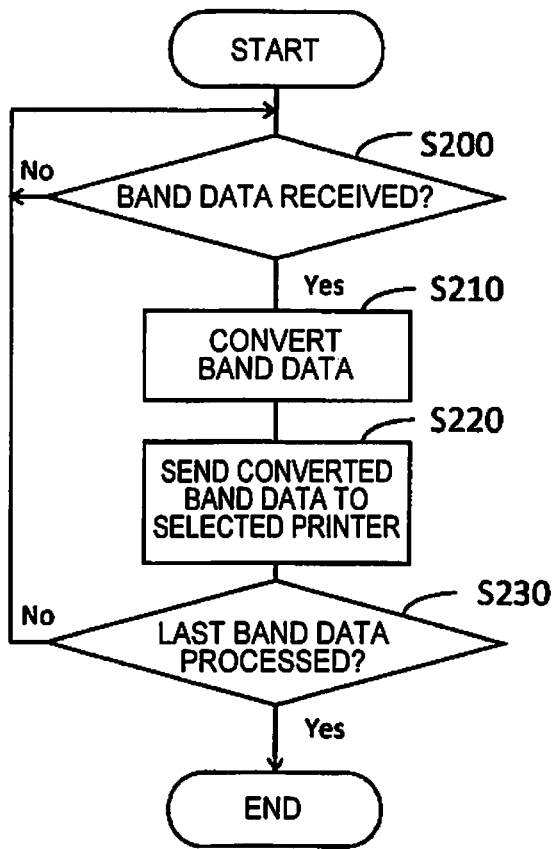
FIG. 6 is a flowchart of a process run by a management server in a first embodiment of the invention.

FIG. 6 is a flow chart of the print management process (print management method) the controller 21 of the management server 20 executes according to the program P2 in the first embodiment of the invention.

The controller 21 (communication controller 24) repeatedly determines whether or not band data was received from the client terminal 10 through the communication interface 25 (step S200), and if band data sent from the client terminal 10 was received (step S200 returns Yes), goes to step S210.

In step S210, the controller 21 (print data generator 23) executes a band data conversion process on the band data determined in step S200 to have been received. In the band data conversion process, the band data is converted to band data in a specific command code system interpretable by the printer identified by the printer identification information added to the band data (the printer selected in step S100). For example, the print data generator 23 adds commands in the command code system that the printer identified by the printer identification information added to the band data can interpret, or applies a compression process dependent on the command code system, to each band data object. The band data resulting from this conversion process is also referred to as the print data (part of the print data).

When processing first band data BD1, the print data generator 23 uses a command code system such as ESC/Page as the command code system that can be interpreted by the printer (first printing device) identified by the printer identification information added to the first band data BD1.

When processing second band data BD2, the print data generator 23 uses a command code system such as ESC/P-R as the command code system that can be interpreted by the printer (second printing device) identified by the printer identification information added to the second band data BD2.

The first band data BD1 is still vertical band data after conversion in step S210, and the second band data BD2 is still horizontal band data after conversion in step S210.

In step S220, the controller 21 (communication controller 24) sends the band data (print data) after conversion in step S210 through the communication interface 25 to the printer identified by the printer identification information added to the band data (the printer selected in step S100).

In step S230, the controller 21 determines if the band data just processed in steps S210 and S220 is the last band data to process, and if it is the last band data, determines the last band data has been processed, that is, determines that processing all print objects is completed (step S230 returns Yes), and ends the flow chart in FIG. 6.

However, if the band data just processed in steps S210 and S220 is not the last band data, the controller 21 determines the last band data has not been processed (step S230 returns No), and returns to step S200.

By repeatedly cycling through steps S200 to S230, the controller 21 can apply the required conversion process to the band data objects sequentially transmitted from the client terminal 10 as the individual process units, and sequentially send the converted band data to the printer.

The printer receiving the converted band data from the management server 20 through the network 60 interprets the commands contained in the received band data, applies other required conversion processes (such as converting the resolution of the band data, converting the color system, halftoning), and prints based on the band data.

In other words, the printer 30 (first printing device) sequentially receives converted first band data BD1 from the management server 20, and when one page of first band data BD1 is received, the controller 31 simultaneously drives the multiple printheads 35 in first band data BD1 units to print the page (print objects) on the print medium M. At this time, the controller 31 drives the printheads 35 while adjusting the width (pixel count) of the first band data BD1 as required according to the width (nozzle count) of the printheads 35, for example.

In printer 40 (second printing device), however, the controller 41, while sequentially receiving the converted second band data BD2 from the management server 20, controls driving each scan of the printhead 44 in second band data BD2 units to print the print objects on the print medium M.

3. Embodiment 2

Figure 7:
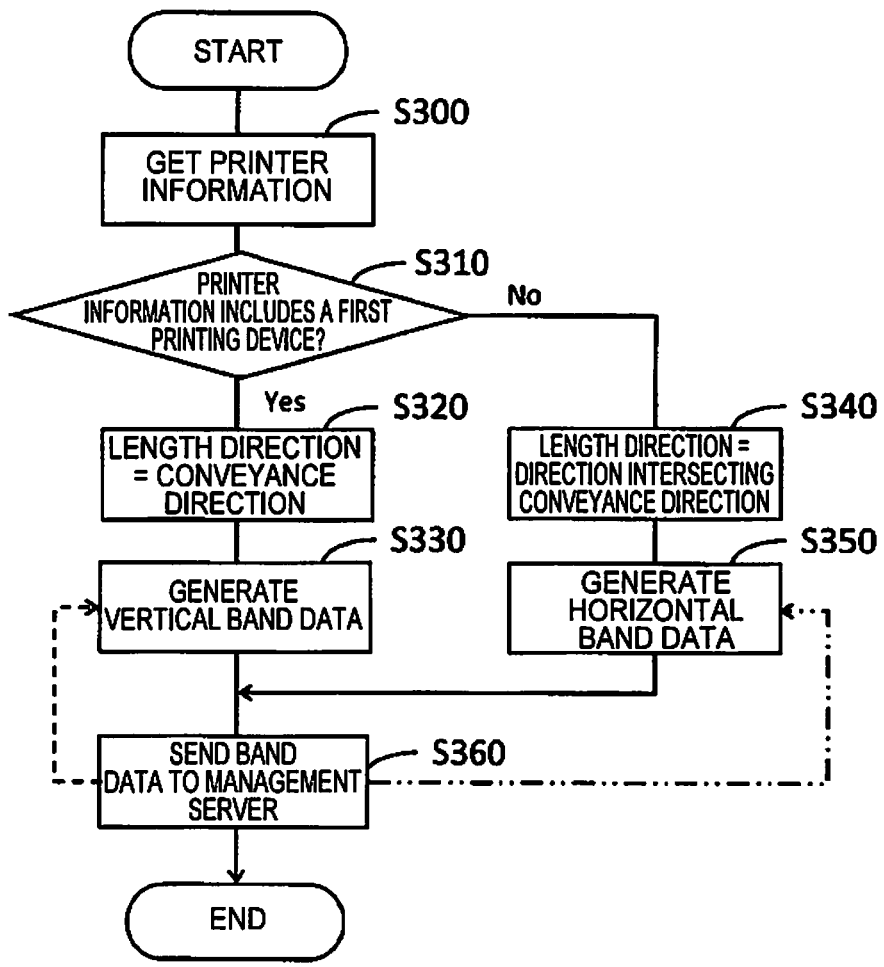
FIG. 7 is a flow chart of a process run by a client terminal in a second embodiment of the invention.

FIG. 7 is a flow chart of the print control process (print control method) the controller 11 of the client terminal 10 executes according to program P1 in a second embodiment of the invention.

Differences between the second embodiment and the first embodiment are described below, while further description of content common to the first embodiment is abbreviated or omitted. In the first embodiment, the client terminal 10 selects the printer to use for printing the print object in response to a user operation, and reports the selected printer to the management server 20. In the second embodiment, however, the client terminal 10 does not select the printer to use for printing the print object. This means that in the second embodiment the client terminal 10 generates and transmits band data without knowing which printer will used to print the print objects.

The controller 11 (information acquisition unit 13) controls the communication controller 15 to communicate with the management server 20 through the communication interface 19, and acquires the printer information 28 related to the printers the management server 20 manages from the management server 20 (step S300). In step S300, the information acquisition unit 13 (or the communication controller 15 and information acquisition unit 13) can be said to function as an acquisition unit that acquires from the management server 20 printing device information indicating whether a printer managed by the management server 20 is a first printing device or a second printing device.

In step S310, the controller 11 (band data generator 14), based on the printer information 28 acquired in step S300, determines if a first printing device is included in the one or more printers managed by the management server 20. The band data generator 14 references the type (model) information of the printers in the printer information 28, and if at least one of the printers managed by the management server 20 is a first printing device (such as printer 30) (step S310 returns Yes), goes to step S320.

However, if by referencing the type information of each printer in the printer information 28 the controller 11 determines a first printing device is not included in the printers the management server 20 manages (step S310 returns No), the band data generator 14 goes to step S340.

In step S320, the band data generator 14 determines the length direction of the band data to generate is the first direction, that is, is in the conveyance direction of the print medium, and goes to step S330.

However, in step S340, the band data generator 14 determines the length direction of the band data to generate is the second direction, that is, intersects the conveyance direction of the print medium, and goes to step S350.

The flow of the process from step S330 to S360, and the flow of the process from step S350 to S360, is the same as the flow of the process from step S130 to S150, and the flow of the process from step S140 to S150, described above in FIG. 4 and FIG. 5. However, unlike in the first embodiment, the band data generator 14 does not add printer identification information for the printer to use for printing to the band data generated in step S330 or step S350.

Figure 8:
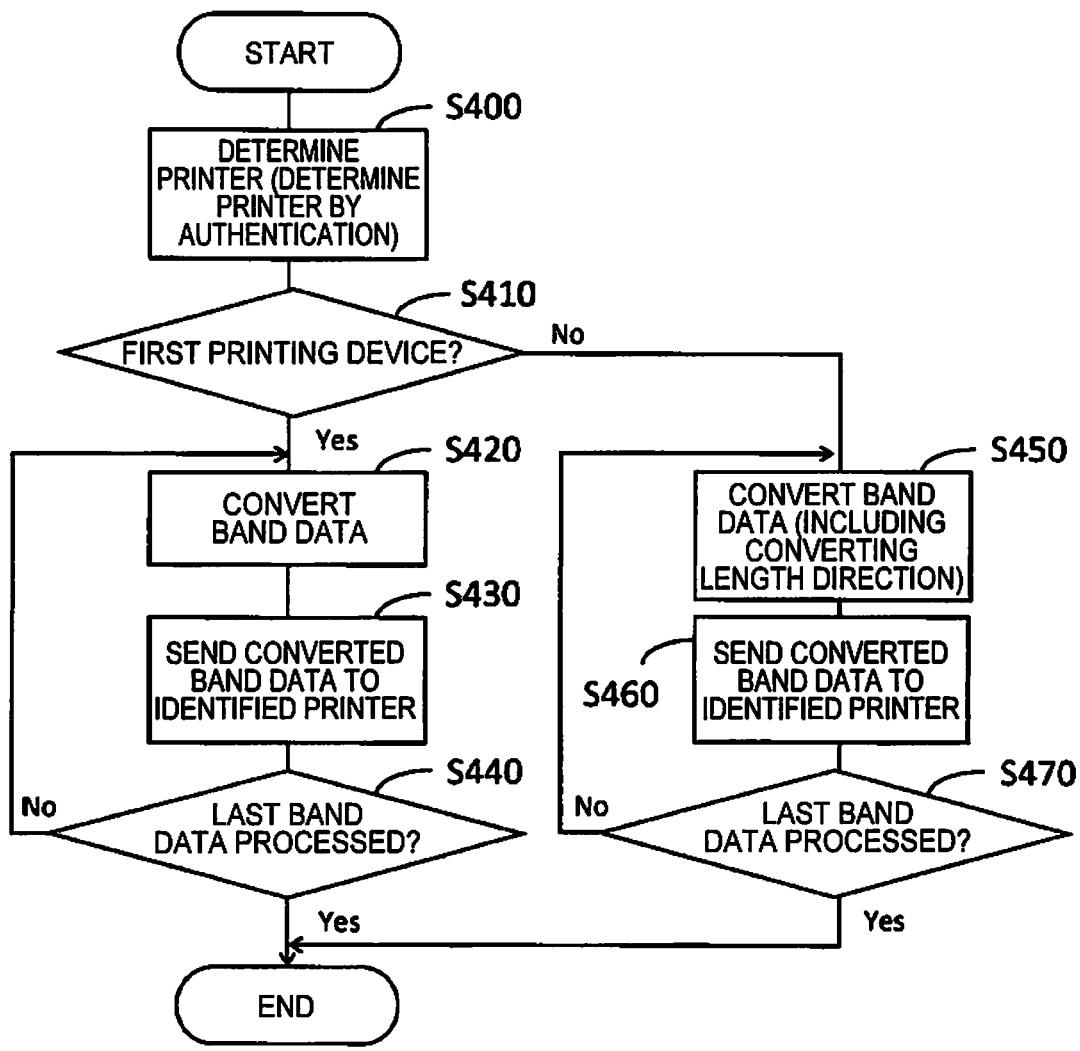
FIG. 8 is a flowchart of a process run by a management server in a second embodiment of the invention.

FIG. 8 is a flow chart of the print management process (print management method) the controller 21 of the management server 20 executes according to the program P2 in the second embodiment of the invention.

In the second embodiment the controller 21 of the management server 20 determines the printer to use for printing the print object based on access from the printer (step S400). In this event, the user operates the printer selected from among the printers in the system 1, and sends a specific request from the printer to the management server 20 through the network 60. The management server 20 that receives the request then determines that the printer that transmitted the request is the printer to use for printing the print object (step S400).

In the second embodiment, the management server 20 simply identifies the printer that sends a specific request as the printer to use to print the print object (the printer to which to send the print data), but the second embodiment may be used for authenticated printing as described below.

Part of the flow for authenticated printing is described first below before continuing with the description of the flow in FIG. 8.

By operating the client terminal 10 and inputting previously set user identification information (information unique to each user authorized to use authenticated printing, referred to below as the user ID), the user logs in to the operating system (OS) of the client terminal 10, and starts the program P1. While executing the process shown in FIG. 7 (step S330 or step S350), the controller 11 of the client terminal 10 that runs the program P1 generates band data based on the print object specified by the user that logged in (referred to below as the logged-in user), and sends the generated band data to the management server 20 (step S360). At this time, the controller 11 (band data generator 14) adds the user ID of the logged-in user to the generated band data.

The controller 21 of the management server 20 stores the band data with a user ID received by the communication interface 25 through the network 60 to the storage 26, for example, in the order received. User information for each authorized user is previously stored in a user database 27 in the storage 26. The user information includes the user ID, or personal information other than the user ID (such as the name or e-mail address), for each user.

The user operates the printer (printer 30 in this example) selected from among the printers in the system 1, and inputs the user ID. The controller 31 of the printer 30 that received input of the user ID through the operation receiver 32 then sends an authentication request including the input user ID through the network 60 to the management server 20. In other words, the action of inputting the user ID to the printer is equivalent to a user authentication request. The printer can therefore be said to have an authentication request receiver (the operation receiver 32 and controller 31, for example) that receives an authentication request through a user operation, and sends the received authentication request to the management server 20.

The controller 21 (authenticator 22) of the management server 20 that received the authentication request then verifies, in response to the authentication request, whether or not to allow printing. The authenticator 22 decides to allow printing (determines authentication is successful) if the user ID contained in the received authentication request matches a user ID for a user registered in the user database 27. As a result, the user that input the user ID to the printer is authenticated by the management server 20 as a user that is allowed to use the printer. The authenticator 22 then determines that the printer that sent the authentication request that was verified to allow printing is the printer to use for printing the print job (step S400). In other words, in the second embodiment, the management server 20 can determine in step S400 based on access (an authentication request) from the printer to use that printer to print the print job.

Note that when the user ID contained in the received authentication request does not match the user ID of a user registered in the user database 27, the authenticator 22 determines to not allow printing (authentication fails). When in authenticated printing the authenticator 22 determines to not allow printing, the authenticator 22 ends the process of the flow chart in FIG. 8 without identifying a printer to use for printing the print job in step S400.

If the printer to use for printing the print object is determined in step S400, in step S410 the controller 21 (print data generator 23) determines if the printer identified in step S400 is a first printing device, and if the printer is a first printing device (step S410 returns Yes), goes to step S420.

However, if the printer identified in step S400 is a second printing device (step S410 returns No), control goes to step S450.

In step S420 and step S430, the print data generator 23 sequentially processes, in first-in, first-out order of being stored to the storage 26, the band data that is stored in the storage 26 and contains a user ID matching the user ID contained in the authentication request for which printing was allowed by the authentication process described above. Steps S420 and step S430 basically conform to step S210 and step S220 (FIG. 6) described above.

That the printer selected in step S400 is a first printing device (for example, printer 30) means that there is at least one first printing device included in the printers managed by the management server 20 (that is, in FIG. 7, step S310 returned Yes). Therefore, when control goes to step S420 based on the decision of step S410, the management server 20 always receives from the client terminal 10 first band data BD1 that is long in the conveyance direction of the print medium (vertical band data), and stores the received first band data BD1 in the storage 26.

As a result, in step S420, the print data generator 23 executes the band data conversion process on the first band data BD1. In this case, the print data generator 23 converts the first band data BD1 to band data using a specific command code system that the printer (first printing device) identified in step S400 can interpret. Then in step S430, the communication controller 24 sends the first band data BD1 (print data) after conversion in step S420 to the printer (first printing device) identified in step S400 through the communication interface 25.

In step S440, the controller 21 determines if the first band data BD1 processed in the most recent step S420 and S430 is the last band data (is the last first band data BD1 containing a user ID matching the user ID contained in the authentication request permitted to print by the authentication process described above), and if it is the last band data, determines that processing all print objects is completed (step S440 returns Yes), and ends the flow chart in FIG. 8.

However, if the band data just processed in steps S420 and S430 is not the last band data BD1, the controller 21 determines the last band data has not been processed (step S440 returns No), and returns to step S420.

In step S450 and step S460, the print data generator 23 sequentially processes, in first-in, first-out order of being stored to the storage 26, the band data that is stored in the storage 26 and contains a user ID matching the user ID contained in the authentication request for which printing was allowed by the authentication process described above. However, step S450 differs from step S420 in that the length direction of the band data may be converted.

That the printer selected in step S400 is a second printing device (for example, printer 40) means that there may be at least one first printing device included in the printers managed by the management server 20 (that is, in FIG. 7, step S310 returned Yes), or that a first printing device is not included in the printers managed by the management server 20 (that is, in FIG. 7, step S310 returned No).

Therefore, when control goes from step S410 to step S450, the band data sent from the client terminal 10 and stored in the storage 26 of the management server 20 is first band data BD1 that is long in the conveyance direction of the print medium (vertical band data), or is second band data BD2 that is long in a direction intersecting the conveyance direction of the print medium (horizontal band data).

When control goes from step S410 to step S450, the printer identified in step S400 is a second printing device, and the print data generator 23 requires second band data BD2 for processing. If the band data stored in the storage 26 is second band data BD2, the print data generator 23 executes a band data conversion process for second band data BD2 stored in the storage 26. In other words, the print data generator 23 converts the second band data BD2 to band data using a specific command code system interpretable by the printer identified in step S400 (second printing device).

However, if the band data stored in the storage 26 is first band data BD1, in step S450 the print data generator 23 first converts the lengthwise direction of the band data, and then converts the band data to band data in a specific command code system the printer (second printing device) identified in step S400 can interpret.

Figures 9A, 9B, 9C:
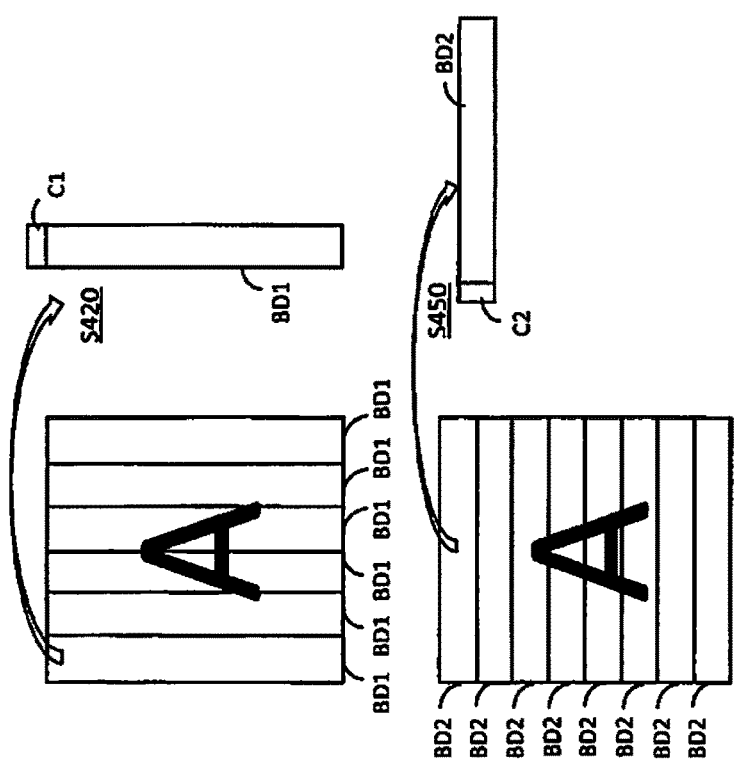
FIG. 9A illustrates the process of step S420.
FIG. 9B illustrates the process of step S450.
FIG. 9C illustrates another example of the process of step S450.

FIG. 9 illustrates the process of step S420 and the process of step S450. FIG. 9A illustrates the process of step S420.

In step S420, the print data generator 23 reads and processes the first band data BD1 (band data having a user ID matching the user ID contained in the authentication request authenticated for printing in the authentication process described above) stored in the storage 26 one segment at a time, adds a command C1 corresponding to the command code system the first printing device can interpret, and generates converted first band data BD1 (print data).

FIG. 9B is the process of step S450 when the band data stored in the storage 26 is horizontal band data BD2. In other words, if the band data (band data having a user ID matching the user ID contained in the authentication request authenticated for printing in the authentication process described above) stored in the storage 26 is second band data BD2, in step S450 the print data generator 23 reads and processes the second band data BD2 one segment at a time, adds a command C2 corresponding to the command code system the second printing device can interpret, and generates converted second band data BD2 (print data).

FIG. 9C is the process of step S450 when the band data stored in the storage 26 is vertical band data BD1. In other words, if the band data (band data having a user ID matching the user ID contained in the authentication request authenticated for printing in the authentication process described above) stored in the storage 26 is first band data BD1, in step S450 the print data generator 23 remerges the first band data BD1 to restore the print object page PO, and then slices the print object page PO from top to bottom to extract horizontal second band data BD2. In this case, the last band data BD2 extracted from the print object page PO is the last band data. As a result, the lengthwise direction of the band data is converted (changed from vertical to horizontal bands). The print data generator 23 then selects the second band data BD2 after converting the length direction for processing, adds a command C2 corresponding to the command code system the second printing device can interpret to the second band data BD2, and generates converted second band data BD2 (print data).

In step S460 (FIG. 8), the communication controller 24 sends the second band data BD2 (print data) resulting from step S450 through the communication interface 25 to the printer (second printing device) identified in step S400.

In step S470, the controller 21 determines if the second band data BD2 processed in the most recent step S450 and S460 is the last band data, and if it is the last band data, determines that processing all print objects is completed (step S470 returns Yes), and ends the flow chart in FIG. 8.

However, if the band data just processed in steps S450 and S460 is not the last band data BD2, the controller 21 determines the last band data has not been processed (step S470 returns No), and returns to step S450.

The printer that receives the converted band data from the management server 20 through the network 60, that is, the printer identified in step S400 to use for printing the print object, then interprets the commands added to the received band data, applies other required conversion processes (such as converting the resolution of the band data, converting the color system, half-toning), and prints based on the band data.

As a result, the printer authorized by the management server 20 for use printing in response to an authentication request resulting from a user operation can print a print job linked to the user based on print data sent from the management server 20 (can execute authenticated printing).

4. Summary

A client terminal 10 that communicates with a management server 20 that manages multiple printers 30 and 40 in this embodiment of the invention executes an acquisition process (step S100, S110, S300) of acquiring from the management server 20 printer information indicating whether a particular printer the management server 20 manages is a first printing device that processes first band data (band data BD1) for bands that are long in a first direction of the print object (the conveyance direction of the print medium), or is a second printing device that processes second band data (band data BD2) for bands that are long in a second direction intersecting the first direction; a band data generating process (step S120, S130, S140, S310, S320, S330, S340, S350) of determining the length direction of the band data based on the acquired printer information, and generating band data of the determined length direction from the print object; and a transmission process (step S150, S360) of sending the band data to the management server 20.

When management server 20 manages multiple types of printers, such as a first printing device and a second printing device, the client terminal 10 in this configuration can provide band data in the orientation appropriate to the type of printer to the management server 20. As a result, downstream processing by the management server 20 to complete printing, and printing by the printer, are more efficient.

In the first embodiment described above, the client terminal 10 selects the printer to use for printing from among the one or more printers the management server 20 manages (step S100), and acquires printer information for the selected printer (step S110). This configuration enables providing to the management server 20 band data in the orientation (first band data BD1 or second band data BD2) appropriate to the type of printer selected in response to a user operation (either a first printing device or second printing device). As a result, the management server 20 can efficiently execute the conversion processes required to generate the band data to be sent to the selected printer.

In the second embodiment, when the client terminal 10 determines a first printing device is included in the one or more printers the management server 20 manages based on printer information 28 acquired from the management server 20 (step S310 returns Yes), the client terminal 10 determines the length direction of the band data is a first direction (conveyance direction of the print medium) (step S320); and when the client terminal 10 determines a first printing device is not included in the one or more printers the management server 20 manages based on printer information 28 acquired from the management server 20 (step S310 returns No), the client terminal 10 determines the length direction of the band data is a second direction (a direction intersecting the conveyance direction of the print medium) (step S340).

In other words, when the printers the management server 20 manages include even only one first printing device, the client terminal 10 assumes that using a first printing device for printing is preferred, and provides to the management server 20 first band data BD1 of an orientation appropriate to a first printing device. As a result, when the management server 20 actually determines in step S400 to use a first printing device for printing, conversion and other processing by the management server 20 can be made more efficient. The second embodiment can therefore be said to be particularly effective in an environment in which a relatively large number of first printing devices, also known as page printers, are used. When the printers the management server 20 manages do not include even one first printing device, the client terminal 10 provides to the management server 20 second band data BD2 of an orientation appropriate to second printing devices, and makes conversion and other processing by the management server 20 more efficient.

In the second embodiment, the printer has an authentication request receiver (such as the operation receiver 32 and controller 31 of printer 30, or the operation receiver 42 and controller 41 of printer 40) that receives an authentication request through a user operation and sends the received authentication request to the management server 20; and a print mechanism (33, 43) that prints based on print data sent thereto.

The management server 20 has an authenticator 22 that, when an authentication request is received, determines whether or not printing is allowed by the authentication request; and a print data generator (print data generator 23 and communication controller 24). When the printer authenticated by the authenticator 22 for use printing is a first printing device (step S410 returns Yes), the print data generator generates first print data (band data BD1 after conversion) that is long in a first direction from the first band data (band data BD1) and sends the generated first print data to the printer authenticated for printing (step S420, S430). When the printer authenticated by the authenticator 22 for use printing is a second printing device (step S410 returns No), the print data generator converts the first band data (band data BD1) to second band data (band data BD2), then generates second print data (band data BD2 after conversion) that is long in a second direction from the second band data (band data BD2) (see FIG. 9C), and sends the generated second print data to the printer authenticated for printing (step S450, S460).

This configuration presumes using the system 1 for authentication printing, presumes that a printer sending an authentication request to the management server 20 in response to a user operation is a first printing device, and the management server 20 receives and stores band data BD1 of an orientation appropriate to a first printing device from the client terminal 10. As a result, authentication printing can be processed efficiently in an environment in which first printing devices, which are a type of page printer, are used relatively often.

Effects of the embodiments thus comprised are described below. That is, by segmenting the data of the print object (print object page PO) into band data on the client terminal 10 side, and sequentially sending the band data to the management server 20, the management server 20 can sequentially convert and send to the printer the received band data (generate print data) without waiting until the data for a full page is received. As a result, compared with the configuration of the related art that starts the required processing after a full page of data is received, the management server 20 starts processing the data of the print job more quickly, and the printer can therefore more quickly start printing based on the print data.

In addition, because the management server 20 in the first embodiment does not need to store the band data received from the client terminal 10 in page units, memory (storage) can be used more efficiently on the management server 20.

5. Other Embodiments

The invention is not limited to the embodiments described above, and can be varied in many ways.

Variation 1

Figure 10:
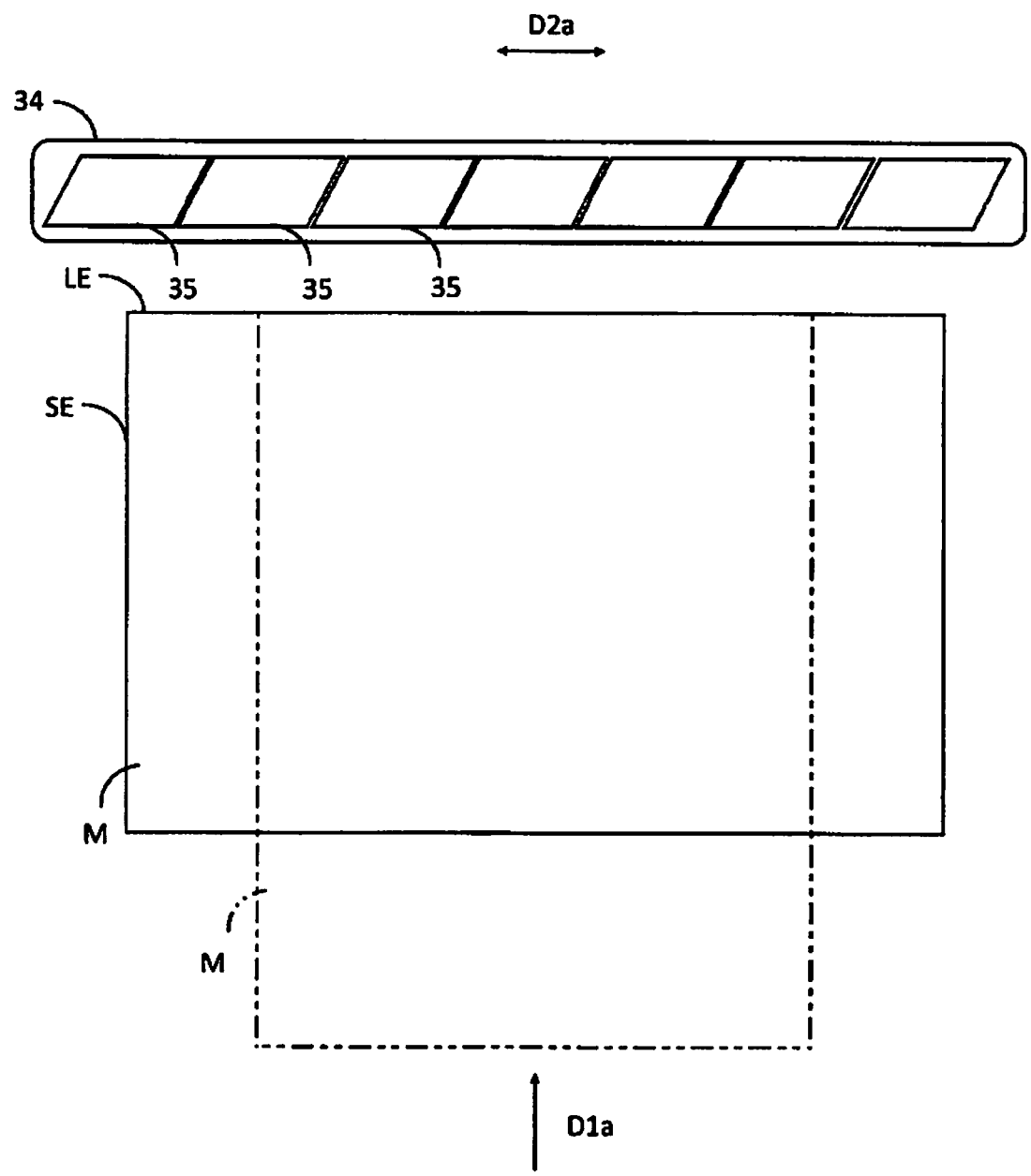
FIG. 10 describes the relationship between the printing mechanism and the direction the print medium is loaded in a first embodiment of the invention.

FIG. 10 illustrates the relationship between a printer 30 that is a first printing device, and the direction in which the print medium M is set in the printer. A print medium M conveyed in direction D1a relative to the printhead unit 34 of the print mechanism 33 can be set in the printer 30 as indicated by the solid line or the dot-dot-dash line as shown in FIG. 10. The print medium M shown in FIG. 10 is A4 size. LE indicates the long edge of the print medium M, and SE indicates the short edge. The printer 30 shown in FIG. 10 can convey A4 size paper in a long edge feed (LEF) mode in which the long edge LE is the leading edge as indicated by the solid line, or a short edge feed (SEF) mode in which the short edge SE is the leading edge as indicated by the dot-dot-dash line. Note that while not shown in FIG. 10, the printer 30 in this example can also feed A3 size paper, which is equal to two A4 size sheets, only in the short edge feed SEF mode due to the physical limitations of the printer 30. To further simplify description, printer 40, which is a second printing device, is a type that can only feed the print medium M in the short edge feed SEF mode.

Presuming this specific configuration, when A4 size and A3 size paper is fed by the printer 30 in the short edge feed SEF mode, band data BD1, which is long in the conveyance direction of the print medium (from top to bottom of the print object), is generated from the print object as described above, and the printer 30 can be driven to print based on the band data BD1.

When printing with printer 40, band data BD2, which is long in the direction intersecting the conveyance direction of the print medium (from the left to right side of the print object), is generated from the print object as described above, and the printer 40 can be controlled to print based on the band data BD2.

However, when printing A4 size paper in the long edge feed LEF mode on printer 30, the print object must be rotated 90 degrees for printing, generating band data BD1 that is long from top to bottom of the print object is not appropriate, and band data BD2, which is long from the left to right side of the print object, must be generated.

To address this, the printer information 28 includes media orientation information indicating the direction in which the print medium is set in the printer, and the controller 11 (band data generator 14) of the client terminal 10 determines the length direction of the band data to generate based on whether the printer is a first printing device or a second printing device and the media orientation indicated by the acquired printer information 28.

More specifically, the controller 21 of the management server 20 acquires from each managed printer information (media orientation information) indicating the direction (for short edge feed SEF or long edge feed LEF) in which the print medium is set in the paper tray of the printer, for example, and the paper size, and stores the acquired information in the printer information 28 as part of the printer information for each printer. As a result, the client terminal 10 can know not only the type of each printer, but also the orientation and size of the print medium loaded in each printer, by referencing the printer information 28.

In the first embodiment, the controller 11 of the client terminal 10 decides step S120 based on the paper orientation and other information. For example, when printer 30 is selected in step S100, the controller 11 gets the printer information for that printer 30 in step S110. If the printer information for printer 30 indicates the orientation of the print medium is for short edge feed SEF, and identifies the printer 30 as a first printing device, control goes to step S130. However, if the printer information for printer 30 acquired in step S110 indicates the orientation of the print medium is for long edge feed LEF, and identifies the printer 30 as a first printing device, the controller 11 determines in step S120 that the length direction of the band data intersects the conveyance direction of the print medium, and control goes to step S140. As a result, when control goes to step S140, horizontal band data BD2 (FIG. 5) is generated from the print object even though the printer to use for printing is a first printing device (printer 30).

However, if A4 size paper is loaded for long edge feed LEF in the printer 30, the print object (in this case, the band data) is rotated 90 degrees for printing. The printer 30 handles this rotation process. Therefore, even if the band data the client terminal 10 extracts from the print object for printer 30 is band data BD2 that is long in the direction intersecting the conveyance direction of the print medium, the band data BD2 is rotated in the printing process of the printer 30, and is therefore band data that is long in the conveyance direction of the print medium.

Note that in the second embodiment when the controller 11 of the client terminal 10 determines in step S310 that a first printing device is included in the printers managed by the management server 20, the controller 11 references the printer information for one of the first printing devices, and branches processing the length direction of the band data to the conveyance direction of the print medium or intersecting the conveyance direction of the print medium based on the paper orientation setting. Also in the second embodiment, the controller 21 of the management server 20 may convert the length direction of the band data as necessary if the orientation of the band data stored in the storage 26 and the orientation of the band data provided to the printer selected in step S400 do not match.

In this first variation, the client terminal 10 generates and provides to the management server 20 band data in the appropriate orientation based on not only the type of printer (first printing device or second printing device), but also on the orientation of the print medium in the printer. As a result, processing by the management server 20 is more efficient, and the printer can be controlled to print appropriately.

Variation 2

Figure 11:
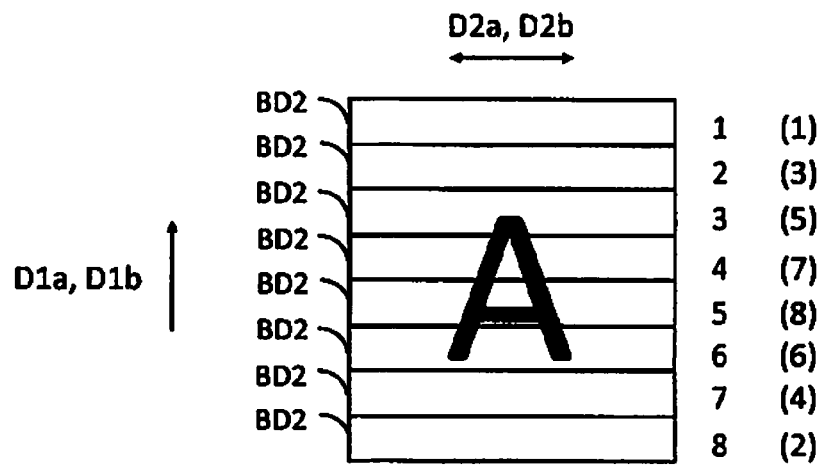
FIG. 11 shows an example of the order for generating band data that is long horizontally.

FIG. 11 illustrates horizontally long band data BD2 generated from the print object in step S140 (or step S350). In the embodiment described above, the band data generator 14 sequentially generates the band data BD2 from top to bottom of the print object page PO. In other words, the band data BD2 is generated sequentially in the order indicated by the numbers on the right side not enclosed in parentheses in FIG. 11, and sent to the management server 20 in the order produced. However, the controller 11 in this second variation generates the band data BD2 by alternating from the top to the bottom of the print object page PO. More specifically, the band data BD2 is generated in the order indicated by the numbers in parentheses in FIG. 11, and sent to the management server 20 in the order produced.

In a second printing device such as printer 40 that scans a serial printhead 44 and prints an image of the band data BD2 on the print medium during each scan, if printing always maintains the original top-bottom direction of the print object, the band data BD2 can be sequentially generated from top to bottom of the print object page PO with no problem.

However, when printing on both sides of the print medium, the print object may be rotated 180 degrees top-bottom on one side of the print medium. When the print object is rotated 180 degrees top-bottom on one side of the print medium, the band data BD2 (print data) at the bottom end of the band data BD2 for one page must be sent first to the second printing device.

However, when the band data BD2 is sequentially generated from the top to the bottom of the print object page PO, the management server 20 cannot start conversion processing of the band data BD2 until after the band data BD2 for the bottom end of one page is sent to the management server 20, and this is not efficient. In this second variation, therefore, the controller 11 alternately generates band data BD2 from the top and bottom sides of the print object page PO, and sends the band data to the management server 20 in the order produced. As a result, whether the print object is rotated top-bottom or the print object is rotated 180 degrees top-bottom, the management server 20 can quickly start processing the band data BD2 sent sequentially from the client terminal 10, and as a result the time when printing by the second printing device starts can be reliably accelerated.

The entire disclosure of Japanese Patent Application No. 2017-212268, filed Nov. 1, 2017 is expressly incorporated by reference herein.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A print control device that communicates with a management device via a network, with the management device managing a printing device, the print control device comprising:
   an acquisition unit configured to acquire from the management device printing device information indicating whether a printing device the management device manages is a first printing device, which processes first band data of bands that are long in a first direction of a print object, or a second printing device, which processes second band data of bands that are long in a second direction intersecting the first direction of the print object;
   a band data generator configured to determine the length direction of band data based on the acquired printing device information, and generate band data in the determined length direction by dividing the print object into bands of a specific band width in a direction intersecting the determined length direction; and
   a transmitter configured to send the band data to the management device via the network for generation of print data of the print object.

2. The print control device described in claim 1, further comprising:
   a selector configured to select a printing device to use from among one or more printing devices the management device manages;
   the acquisition unit acquiring the printing device information of the selected printing device.

3. The print control device described in claim 1, wherein:
   the printing device information is information indicating whether a printing device is a first printing device that prints by multiple printheads disposed in a direction intersecting the conveyance direction of the print medium, or is a second printing device that prints by scanning a printhead in a direction intersecting the conveyance direction of the print medium,
      the conveyance direction of the print medium being the first direction, and the direction intersecting the conveyance direction being the second direction.

4. The print control device described in claim 1, wherein:
   the printing device information includes media orientation information indicating the orientation of the print medium set in the printing device; and
   the band data generator determines the length direction of the band data based on whether the acquired printing device information indicates a first printing device or second printing device, and the media orientation information.

5. A print control device that communicates with a management device, which manages a printing device, comprising:
   an acquisition unit configured to acquire from the management device printing device information indicating whether a printing device the management device manages is a first printing device, which processes first band data of bands that are long in a first direction of a print object, or a second printing device, which processes second band data of bands that are long in a second direction intersecting the first direction of the print object;
   a band data generator configured to determine the length direction of band data based on the acquired printing device information, and generate band data in the determined length direction from the print object; and
   a transmitter configured to send the band data to the management device,
   the band data generator determining, based on the acquired printing device information, the length direction of the band data is the first direction when a first printing device is included in the one or more printing devices the management device manages, and
      determining, based on the acquired printing device information, the length direction of the band data is the second direction when a first printing device is not included in the one or more printing devices the management device manages.

6. A computer-readable storage medium storing a print control program configured to cause a computer that communicates with a management device via a network, with the management device managing a printing device, to execute:
   an acquisition function of acquiring from the management device printing device information indicating whether a printing device the management device manages is a first printing device, which processes first band data of bands that are long in a first direction of a print object, or a second printing device, which processes second band data of bands that are long in a second direction intersecting the first direction of the print object;
   a band data generating function of determining the length direction of band data based on the acquired printing device information, and generating band data in the determined length direction by dividing the print object into bands of a specific band width in a direction intersecting the determined length direction; and
   a transmission function of sending the band data to the management device via the network for generation of print data of the print object.

* * * * *